United States Patent
Akabane (10) Patent No.: US 7,211,917 B2
(45) Date of Patent: May 1, 2007

(54) MOTOR WITH A MAGNET FIXED ON THE INNER PERIPHERAL FACE OF A CIRCUMFERENTIAL WALL

(75) Inventor: Makoto Akabane, Nagano (JP)

(73) Assignee: NIDEC Sankyo Corporation, Nagano (JP)

( * ) Notice: Subject to any disclaimer, the term of this patent is extended or adjusted under 35 U.S.C. 154(b) by 0 days.

(21) Appl. No.: 11/300,833

(22) Filed: Dec. 14, 2005

(65) Prior Publication Data

US 2006/0158054 A1 Jul. 20, 2006

(30) Foreign Application Priority Data

Dec. 17, 2004 (JP) ............... 2004-366592

(51) Int. Cl.
*H02K 1/27* (2006.01)
(52) U.S. Cl. .............. 310/154.03; 310/91; 310/156.21; 310/156.22
(58) Field of Classification Search ........... 310/154.07, 310/154.21
See application file for complete search history.

(56) References Cited

U.S. PATENT DOCUMENTS

| | | | | |
|---|---|---|---|---|
| 1,688,810 A | * | 10/1928 | Hemmeler ............. | 310/154.03 |
| 4,088,177 A | * | 5/1978 | Armstrong et al. ......... | 164/109 |
| 4,334,163 A | * | 6/1982 | Ascoli ........................ | 310/90 |
| 4,481,437 A | * | 11/1984 | Parker ....................... | 310/191 |
| 4,918,830 A | * | 4/1990 | Aso ............................ | 29/596 |
| 4,933,582 A | * | 6/1990 | Hata et al. ................. | 310/154.14 |
| 5,008,578 A | * | 4/1991 | Pace ........................... | 310/256 |
| 5,040,286 A | * | 8/1991 | Stark ........................... | 29/598 |
| 5,057,730 A | * | 10/1991 | Yoshida ..................... | 310/91 |
| 5,109,172 A | * | 4/1992 | Pace ........................... | 310/154.43 |
| 5,113,104 A | * | 5/1992 | Blaettner et al. ............ | 310/90 |
| 5,160,867 A | * | 11/1992 | Niemela ................... | 310/154.09 |
| 5,264,749 A | * | 11/1993 | Maeda et al. ............ | 310/154.07 |
| 5,315,191 A | * | 5/1994 | Suzuki ................... | 310/40 MM |
| 5,497,039 A | * | 3/1996 | Blaettner et al. ............. | 310/51 |
| 5,596,235 A | * | 1/1997 | Yazaki et al. ............. | 310/67 R |
| 6,013,961 A | * | 1/2000 | Sakamaki et al. ........ | 310/68 B |

(Continued)

FOREIGN PATENT DOCUMENTS

DE 4107602 A1 * 9/1992

(Continued)

OTHER PUBLICATIONS

Patent Abstracts of Japan, Publication No. 2004-159384 / published on Jun. 3, 2004 "Method for Jointing Rubber Magnet to Yoke" Sankyo Denki Co Ltd (Appln No. 2002-320233 / Nov. 1, 2002).

*Primary Examiner*—Darren Schuberg
*Assistant Examiner*—Ondria Garner
(74) *Attorney, Agent, or Firm*—Reed Smith LLP (57) ABSTRACT

A motor includes a circumferential wall part of a case provided with an opening part on one end side in an axial direction and at least a magnet fixed to the inner peripheral face of the circumferential wall part. At least a part of the outer peripheral face of the magnet is fixed to the inner peripheral face of the circumferential wall part with a first adhesive, and further, the outer peripheral edge part of a first end face of the magnet that is located on a side of the opening part is fixed to the inner peripheral face of the circumferential wall part with a second adhesive.

9 Claims, 8 Drawing Sheets

U.S. PATENT DOCUMENTS

| | | | |
|---|---|---|---|
| 6,534,889 B2 * | 3/2003 | Katagiri et al. | 310/91 |
| 6,552,459 B2 * | 4/2003 | Burton | 310/156.08 |
| 6,831,387 B2 * | 12/2004 | Kondo et al. | 310/154.03 |
| 6,940,194 B1 * | 9/2005 | Lauk | 310/90 |
| 2002/0190583 A1 * | 12/2002 | Ortt et al. | 310/47 |
| 2004/0217664 A1 * | 11/2004 | Kuwabara et al. | 310/156.21 |
| 2006/0103252 A1 * | 5/2006 | Yokota | 310/156.26 |

FOREIGN PATENT DOCUMENTS

| | | | |
|---|---|---|---|
| FR | 2736220 A1 * | 1/1997 | |
| GB | 2111410 A * | 7/1983 | |
| JP | 57206260 A * | 12/1982 | |
| JP | 05336687 A * | 12/1993 | |
| JP | 11-356026 | 12/1999 | |
| JP | 2001238375 A * | 8/2001 | |
| JP | 02-53270 | 2/2002 | |
| JP | 2002223543 A * | 8/2002 | |
| JP | 03-60853 | 2/2003 | |
| JP | 2005323487 A * | 11/2005 | |

* cited by examiner

MOTOR WITH A MAGNET FIXED ON THE INNER PERIPHERAL FACE OF A CIRCUMFERENTIAL WALL

CROSS-REFERENCE TO RELATED APPLICATION

This application claims priority to Japanese Application No. 2004-366592 filed Dec. 17, 2004, which is incorporated herein by reference.

BACKGROUND OF THE INVENTION a) Field of the Invention

The present invention relates to a motor in which a magnet is fixed on the inner peripheral face of a circumferential wall part and a manufacturing method for the motor.

b) Description of the Related Art

In a motor in which a rotor is disposed on the inner side of a magnet that is fixed on the inner peripheral face of a circumferential wall part of a case, it has been proposed that a part of the case is cut and erected and the magnet is pressed and fixed with a fixing pin in order to fix the magnet on the inner peripheral face of the case, (see, for example, Japanese Utility Model Laid-Open No. Hei 03-60853).

Also, it has been proposed that a projection is formed in the circumferential wall part of a case and a magnet is sandwiched and fixed by the projection (see, for example, Japanese Utility Model Laid-Open No. Hei 02-53270).

Alternatively, it has been also proposed that, after a magnet is inserted into the circumferential wall part of a rotor, an adhesive is coated between the end face of the magnet on its opening part side and the circumferential wall part to adhesively fix the magnet on the circumferential wall part. It has been also proposed that a groove extended in an axial direction is formed on the circumferential wall part of a rotor and an adhesive is supplied from the groove (see, for example, Japanese Patent Laid-Open No. Hei 11-356026).

Further, it has been also proposed that a groove extended in an axial direction is formed on the outer peripheral face of a magnet and, after an adhesive is coated on the circumferential wall part of a yoke, the magnet is slid along the circumferential wall part of the yoke from the opening part side in the axial direction to be fixed (see, for example, Japanese Patent Laid-Open No. 2004-159384).

However, as described in the first prior art reference mentioned above, when a fixing member such as a fixing pin is used, the number of component parts increases and a lot of time and labor is required for the working operation and thus cost is increased. Further, as described in the second recited prior art reference, when a magnet is sandwiched and fixed by a projection or is press-fitted, debris of the magnet or a crack in the magnet may occur.

On the other hand, a method where a magnet is adhesively fixed as described in the third and fourth mentioned prior art references may eliminate the problems described in the first and second prior art references. However, as described in the third prior art reference, when adhesion is performed only between the end face of a magnet and the circumferential wall part of a case on the opening part side, or when an adhesive is supplied from a groove, the area of adhesion is small and thus a sufficient adhesive strength cannot be ensured. Further, as described in the fourth prior art reference, in the case that, after an adhesive is coated on the circumferential wall part of a yoke, a magnet is moved from the opening part side of the yoke in the axial direction along the circumferential wall part of the yoke, the adhesive may be in a sparse state on the opening part side of the yoke even when a groove is formed on the outer peripheral face of the magnet, and thus sufficient adhesive strength cannot be ensured.

OBJECTS AND SUMMARY OF THE INVENTION

In view of the above-mentioned problems, it is a primary object and advantage of the present invention to provide a motor which is capable of ensuring a sufficient fixing strength even when a magnet is fixed to the inner peripheral face of a circumferential wall part with an adhesive.

In order to achieve the above object and advantage, according to an embodiment of the present invention, there is provided a motor including a circumferential wall part of a case which is provided with an opening part on one end side in an axial direction, and at least a magnet which is fixed to the inner peripheral face of the circumferential wall part. At least one part of the outer peripheral face of the magnet is fixed with a first adhesive to the inner peripheral face of the circumferential wall part, and further, the outer peripheral edge part of a first end face of the magnet that is located on a side of the opening part is fixed with a second adhesive to the inner peripheral face of the circumferential wall part. In the present invention, a case provided with the opening part on one end side includes a rotor case to which a rotor magnet is fixed as well as a stationary case within which a rotor is accommodated. Further, the same adhesive or different adhesives may be used as the first adhesive and the second adhesive.

Further, according to an embodiment of the present invention, there is provided a manufacturing method for a motor including the steps of providing a case which is provided with an opening part on one end side in an axial direction, providing at least a magnet which is to be fixed on an inner peripheral face of a circumferential wall part of the case, and coating a first adhesive on an outer peripheral face of the magnet or on an inner peripheral face of the circumferential wall part. After that, in a first step, the magnet is slid from the opening part side in the axial direction along the inner peripheral face of the circumferential wall part, and then the magnet is disposed at a predetermined position on the inner peripheral face of the circumferential wall part. After that, in a second step, a second adhesive is coated between a first end face of the magnet that is located on a side of the opening part and the inner peripheral face of the circumferential wall part.

In accordance with an embodiment, the outerperipheral face of the magnet is adhesively fixed on the inner peripheral face of the circumferential wall part with a first adhesive, and further, on the opening part side of the circumferential wall part, the first end face of the magnet and the inner peripheral face of the circumferential wall part are fixed to each other with a second adhesive. Therefore, since adhesion area between the magnet and the circumferential wall part is large, a sufficient fixing strength can be ensured even when the magnet is fixed to the inner peripheral face of the circumferential wall part with an adhesive.

In accordance with an embodiment, at lest one of one or more first recessed part, which is formed to be dented in the axial direction, and one or more first protruded part, which is protruded in the axial direction, is formed at least on the outer peripheral side in the first end face of the magnet. The outer peripheral edge part of the first recessed part or an outer peripheral edge part of the first protruded part is fixed on the inner peripheral face of the circumferential wall part with the second adhesive.

In other words, in the manufacturing method for a motor in accordance with an embodiment, the magnet is previously formed with one or more first recessed part, which is formed to be dented in the axial direction, or one or more first protruded part, which is protruded in the axial direction, is formed at least on the outer peripheral side in the first end face of the magnet. In addition, in the above-mentioned second step in the manufacturing method, the second adhesive is coated at least between the first recessed part or the first protruded part and the inner peripheral face of the circumferential wall part. According to the construction described above, the length dimension of the outer peripheral edge part of the magnet (along-the-line distance) becomes longer in comparison with the case where the first recessed part or the first protruded part is not provided, and thus the first end face of the magnet is fixed with the second adhesive over a long distance. Therefore, a sufficient fixing strength can be ensured even when the magnet is fixed to the inner peripheral face of the circumferential wall part with an adhesive.

In accordance with an embodiment, the outer peripheral edge part the second end face of the magnet which is located on the opposite side to the opening part of the circumferential wall part is fixed to the inner peripheral face of the circumferential wall part with the first adhesive. According to the construction described above, since the adhesion area between the magnet and the circumferential wall part is further increased, a sufficient fixing strength can be ensured even when the magnet is fixed to the inner peripheral face of the circumferential wall part with an adhesive.

In this case, at lest one of one or more second recessed part, which is formed to be dented in the axial direction, and one or more second protruded part, which is protruded in the axial direction, may be preferably formed at least on the outer peripheral side in the second end face of the magnet, and the outer peripheral edge part of the second recessed part or the outer peripheral edge part of the second protruded part may be preferably fixed on the inner peripheral face of the circumferential wall part with the first adhesive.

In other words, in the manufacturing method for a motor in accordance with an embodiment, the magnet is previously formed with one or more second recessed part, which is formed to be dented in the axial direction, or one or more second protruded part, which is protruded in the axial direction, is formed at least on the outer peripheral side in the second end face of the magnet which is located on the opposite side to the opening part of the circumferential wall part. In addition, in the above-mentioned first step in the manufacturing method, the first adhesive is preferably coated at least at the same position as that in the second recessed part or the second protruded part in the axial direction. According to the construction described above, the length dimension of the outer peripheral edge part (along-the-line distance) becomes longer in comparison with the case where the second recessed part or the second protruded part is not provided, and thus the magnet and the circumferential wall part are fixed to each other with the first adhesive over a long distance. Therefore, a sufficient fixing strength can be ensured even when the magnet is fixed to the inner peripheral face of the circumferential wall part with an adhesive.

In accordance with an embodiment, the recessed part is formed in a shape where an entire portion in a thickness direction of the magnet is removed, or in a shape which is obliquely chamfered from a midway position of the magnet in the thickness direction toward the outer peripheral side.

In accordance with an embodiment, the recessed part is formed such that at least one of a side face part extending in the axial direction and a bottom part perpendicular to the axial direction is formed in a shape which is obliquely chamfered from a midway position of the magnet in the thickness direction toward the outer peripheral side. Further, in accordance with an embodiment, the entire outer peripheral edge part of the end face of the magnet is obliquely chamfered from a midway position of the magnet in the thickness direction toward the outer peripheral side.

The first adhesive and the second adhesive may be coated separately and then cured at the same time. However, in the case that both the first adhesive and the second adhesive are heat-curing resin, it is preferable that the first adhesive is thermally cured in the first step and, after that, the second adhesive is thermally cured in the second step. According to the construction described above, the heat curing of the first adhesive can be enhanced because the first adhesive is further thermally cured when the second adhesive is thermally cured in the second step.

According to an embodiment of the present invention, the outer peripheral face of the magnet is adhesively fixed with the first adhesive to the inner peripheral face of the circumferential wall part, and further, the first end face of the magnet that is located on the side of the opening part of the circumferential wall part is fixed with the second adhesive to the inner peripheral face of the circumferential wall part. Therefore, since the adhesion area between the magnet and the circumferential wall part is increased, a sufficient fixing strength can be ensured even when the magnet is fixed to the inner peripheral face of the circumferential wall part with an adhesive.

Other features and advantages of the invention will be apparent from the following detailed description, taken in conjunction with the accompanying drawings that illustrate, by way of example, various features of embodiments of the invention.

DESCRIPTION OF THE PREFERRED EMBODIMENTS

A motor in accordance with an embodiment of the present invention will be described below with reference to the accompanying drawings.

Figure 1:
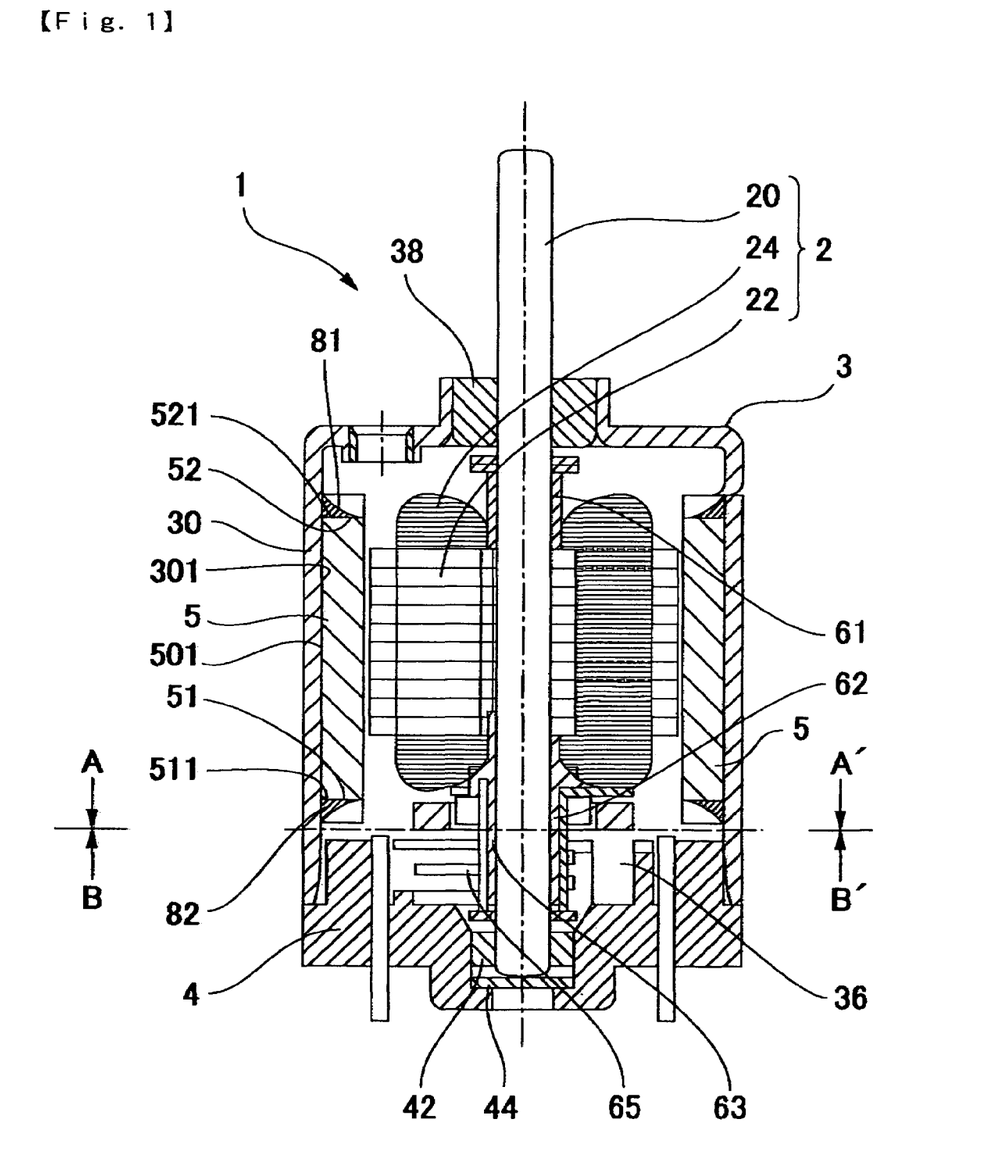
FIG. 1 is a cross-sectional view showing a motor in accordance with an embodiment of the present invention.
Figure 2:
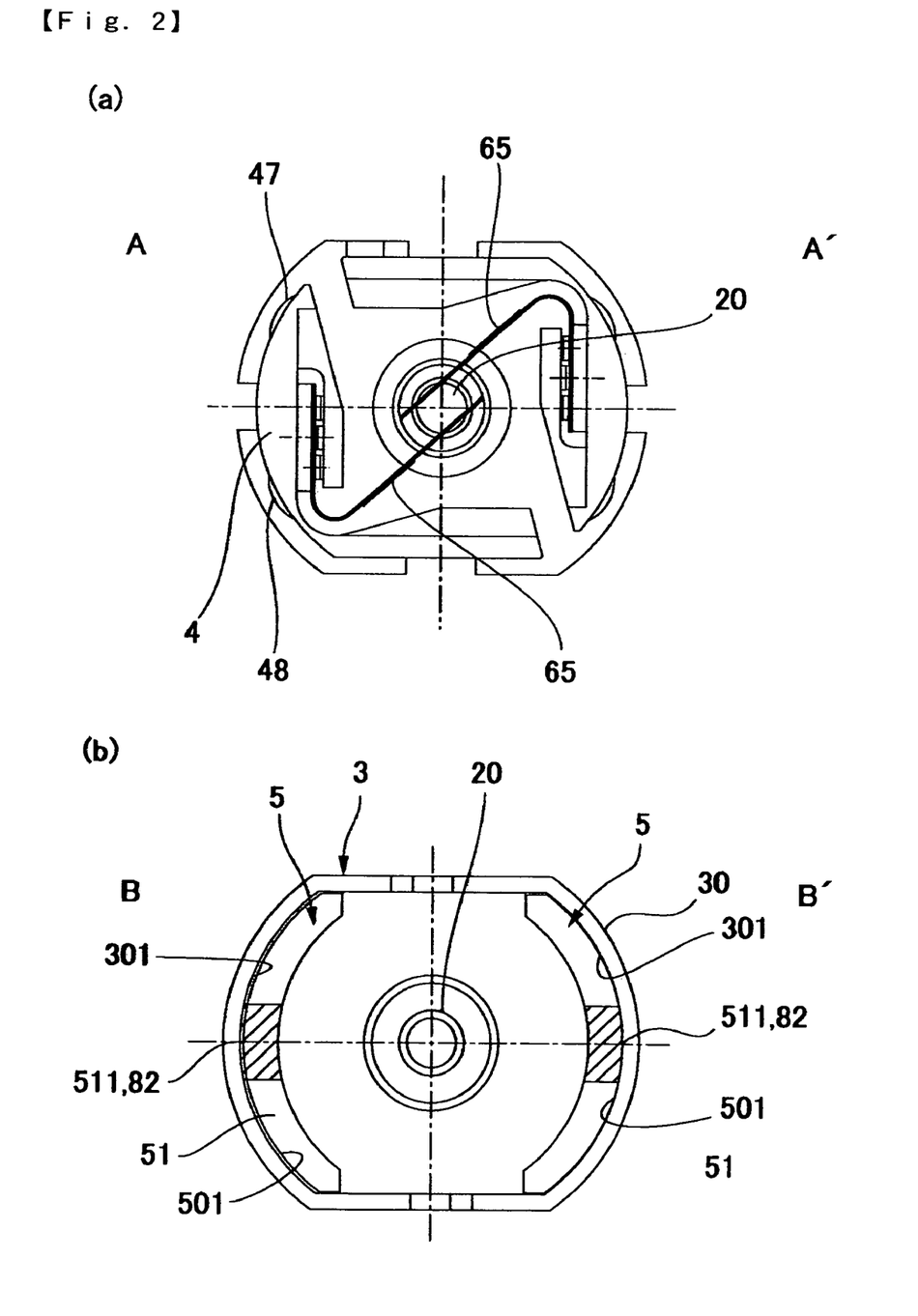
FIG. 2(a) is a cross-sectional view showing the motor which is cut by the line "A–A'" in FIG. 1
FIG. 2(b) is a cross-sectional view showing the motor which is cut by the line "B–B'"
Figure 3:
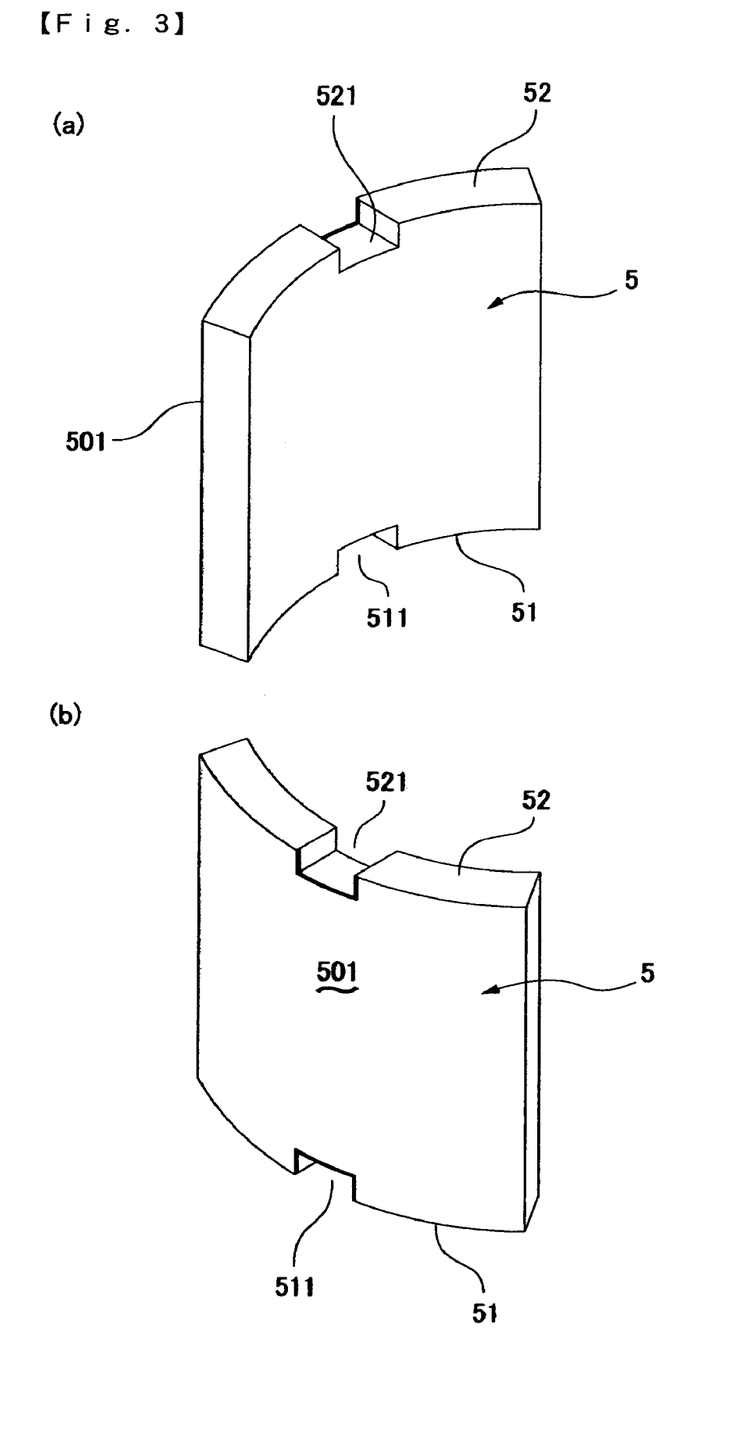
FIG. 3(a) is a perspective view showing a magnet used in the motor shown in FIG. 1, which is viewed from its inner peripheral side.
FIG. 3(b) is a perspective view showing the magnet which is viewed from its outer peripheral side.

FIG. 1 is a cross-sectional view showing a motor to which the present invention is applied. FIG. 2(a) is a cross-sectional view showing the motor which is cut and viewed in the direction shown by the line "A–A'" in FIG. 1 and FIG. 2(b) is a cross-sectional view showing the motor which is cut and viewed in the direction shown by the line "B–B'". FIG. 3(a) is a perspective view showing a magnet used in the motor shown in FIG. 1, which is viewed from its inner peripheral side, and FIG. 3(b) is a perspective view showing the magnet which is viewed from its outer peripheral side. In FIGS. 3(a) and 3(b), the portion corresponding to the outer peripheral edge part of a recessed part which is formed in the magnet is shown with a thick line.

In FIG. 1 and FIGS. 2(a) and 2(b), a motor 1 in accordance with an embodiment includes a case 3 provided with an opening part 36 on one end side in an axial direction, a lid member 4 fitted to the opening part 36 of the case 3, two magnets 5 fixed on an inner peripheral face 301 of a circumferential wall part 30 of the case 3, and a rotor 2 whose outer peripheral face faces the inner peripheral faces of the magnets 5. The rotor 2 includes a rotation shaft 20 extended in an axial direction, a rotor core 22 which is interposed by resin sleeves 61, 62 from both sides in the axial direction and fixed to the rotation shaft 20, and a coil 24 wound around the rotor core 22. The rotation shaft 20 is rotatably supported by a radial bearing 38 disposed at the bottom part of the case 3 and rotatably supported by a radial bearing 42 and a thrust bearing 44 which are mounted on the center hole of the lid member 4. In the rotation shaft 20, a commutator 63 is constructed on the outer peripheral face of the sleeve 62 on the side of the opening part 36 of the case 3. Brushes 65 are in contact with the commutator 63. Terminals of the coil wire drawn out from the coil 24 are connected to terminals formed on the sleeve 62.

The case 3 is made of a magnetic material so as to perform a function as a yoke. Further, the case 3 is formed in an oval or elliptical shape in cross section when it is cut in a direction perpendicular to the axial direction. Each of two magnets 5 are, as shown in FIG. 2(b) and FIGS. 3(a) and 3(b), formed in a circular arc shape corresponding to the inner peripheral face of the case 3 when it is cut in a direction perpendicular to the axial direction. Further, as shown in FIG. 2(a), small projecting parts 47, 48 for press-fitting to be fixed to the case 3 are formed in the lid member 4. The present invention may be applied to a case 3 which is in a circular shape when it is cut in a direction perpendicular to the axial direction.

As shown in FIG. 1 and FIGS. 3(a) and 3(b), in accordance with an embodiment, a first recessed part 511 dented in the axial direction is formed in a first end face 51 of the magnet 5 which is located on the opening part 36 side of the case 3. Further, a second recessed part 521 dented in the axial direction is formed in a second end face 52 of the magnet 5 which is located on the opposite side to the opening part 36 of the case 3.

The first recessed part 511 and the second recessed part 521 are only required to be dented in the axial direction at least on the outer peripheral side (circumferential wall part 30 side of the case 3). However, in this embodiment, the first recessed part 511 and the second recessed part 521 are formed in the shape that the entire in the thickness direction of the magnet 5 is removed.

FIGS. 4(a) through 4(e) are explanatory views showing the steps through which a magnet is adhesively fixed on the inner peripheral face of the circumferential wall part of the case in a manufacturing method in accordance with an embodiment of the present invention.

Figure 4:
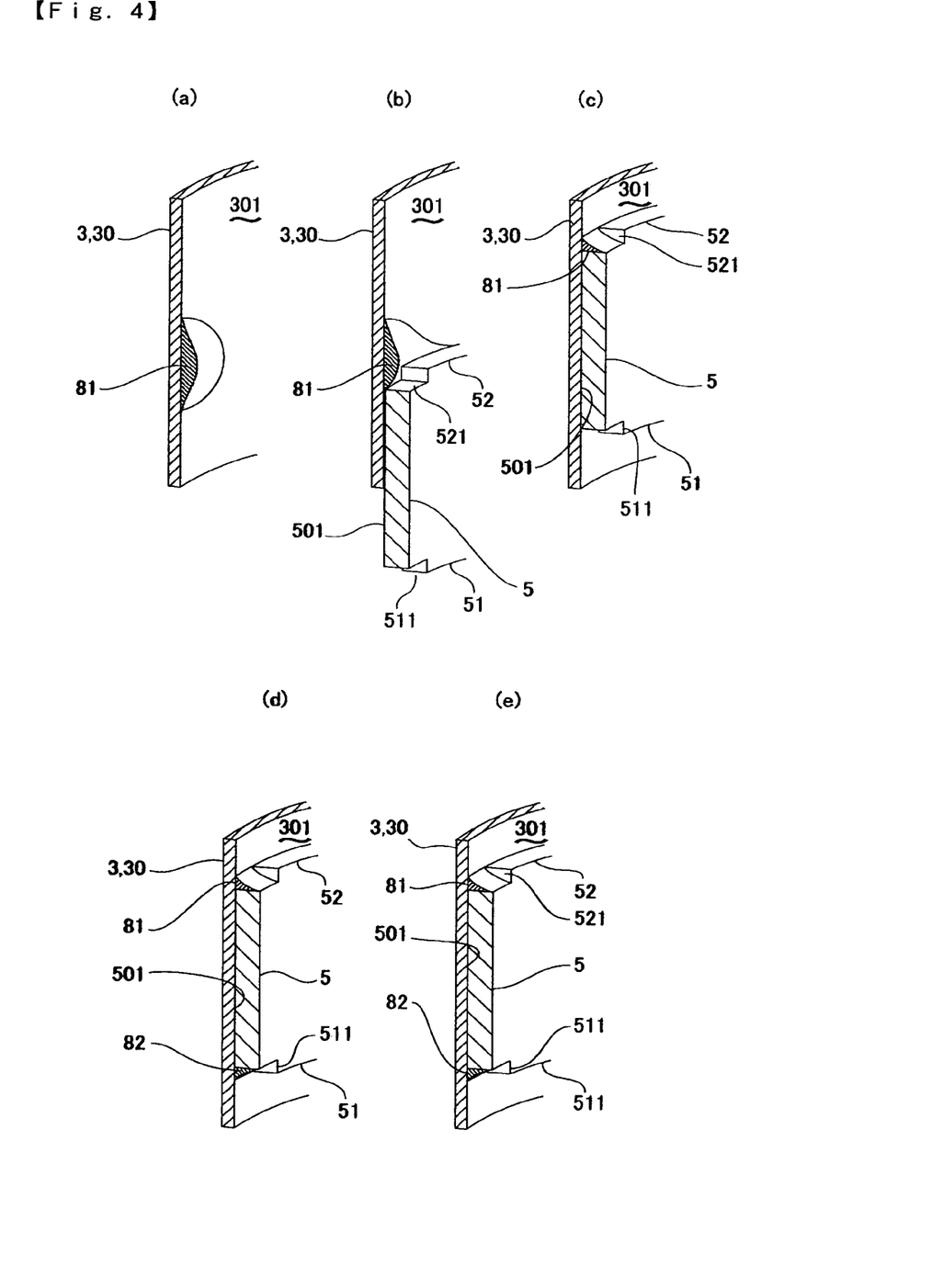
FIGS. 4(a) through 4(e) are explanatory views showing the steps through which a magnet is adhesively fixed on the inner peripheral face of a circumferential wall part of a case in a manufacturing method in accordance with an embodiment of the present invention.

Next, a fixing structure of the magnet 5 to the circumferential wall part 30 of the case 3 in the motor 1 in accordance with an embodiment will be described as well as describing a manufacturing method for the motor 1. Two magnets 5 have the same construction and are fixed to the case 3 in the same manner and thus only one of the magnets 5 is shown in FIG. 4.

In order to fix the magnet 5 to the circumferential wall part 30 of the case 3 in the manufacturing method for a motor 1 in accordance with an embodiment, in the first step, as shown in FIG. 4(a), a first adhesive 81 made of thermosetting resin such as epoxy system is coated on the inner peripheral face 301 of the circumferential wall part 30 of the case 3 in a spot-shaped manner. In this case, the first adhesive 81 is coated at least at the same position as that of the second recessed part 521 in the axial direction. Next, as shown in FIG. 4(b), the magnet 5 is slid in the axial direction along the inner peripheral face 301 of the circumferential wall part 30 from the opening part 36 side and disposed at a predetermined position as shown in FIG. 4(c). As a result, the adhesive is pushed by and moved with the second end face 52 of the magnet 5 while it is extended between the outer peripheral face 501 of the magnet 5 and the inner peripheral face 301 of the circumferential wall part 30 of the case 3. Therefore, when the first adhesive 81 is thermally cured, at least one part of the outer peripheral face 501 of the magnet 5 is fixed with the first adhesive 81 on the inner peripheral face 301 of the circumferential wall part 30. Further, the outer peripheral edge part of the second recessed part 521 on the second end face 52 side is fixed with the first adhesive 81 on the inner peripheral face 301 of the circumferential wall part 30.

Next, in the second step, as shown in FIG. 4(d), after the second adhesive 82 made of thermosetting resin such as epoxy system is coated on the inner side of the first recessed part 511 from the opening part 36 side, the second adhesive 82 is thermally cured. As a result, as shown in FIG. 4(e), the outer peripheral edge part of the first recessed part 511 is fixed with the second adhesive 82 on the inner peripheral face 301 of the circumferential wall part 30. In this case, the second adhesive 82 may use the same adhesive as the first adhesive 81 but a different adhesive may be used.

As described above, in the motor 1 in accordance with an embodiment, apart of the outer peripheral face 501 of the magnet 5 is adhesively fixed to the inner peripheral face 301 of the circumferential wall part 30 by the first adhesive 81, and the first end face 51 of the magnet 5 and the inner peripheral face 301 of the circumferential wall part 30 are fixed to each other with the second adhesive 82 on the opening part 36 side of the circumferential wall part 30. Therefore, even when the first adhesive 81 is formed in a sparse state on the opening part 36 side and in a dense state on the opposite side to the opening part 36, the end face of the magnet 5 and the inner peripheral face 301 of the circumferential wall part 30 are fixed to each other with the second adhesive 82 on the opening part 36 side of the circumferential wall part 30. In addition, since the first recessed part 511 is formed in the first end face 51 on the opening part 36 side of the magnet 5, the length dimension of the outer peripheral edge part (along-the-line distance) becomes longer in comparison with the case where the first recessed part 511 is not provided, and thus the end face of the magnet 5 is fixed with the second adhesive 82 over a long distance. Consequently, according to this embodiment, a sufficient fixing strength can be ensured even when the magnet 5 is fixed to the inner peripheral face 301 of the circumferential wall part 30 with an adhesive.

Further, in accordance with an embodiment, the second end face 52 of the magnet 5 and the inner peripheral face 301 of the circumferential wall part 30 are fixed with the first adhesive 81 on the opposite side to the opening part 36 of the circumferential wall part 30. In addition, on the second end face 52 side, the outer peripheral edge part of the second recessed part 521 is fixed to the inner peripheral face 301 of the circumferential wall part 30 with the first adhesive 81. Therefore, in accordance with an embodiment, the length dimension of the outer peripheral edge part (along-the-line distance) becomes longer in comparison with the case where the second recessed part 521 is not provided, and thus the second end face 52 of the magnet 5 is fixed with the first adhesive 81 over a long distance. Consequently, according to this embodiment, a sufficient fixing strength can be ensured even when the magnet 5 is fixed to the inner peripheral face 301 of the circumferential wall part 30 with an adhesive.

Further, in accordance with an embodiment, heat curing resin of epoxy system is used as the first adhesive 81 and the second adhesive 82 and, after the first adhesive 81 is thermally cured in the first step, the second adhesive 82 is thermally cured in the second step. Therefore, since the heat curing of the first adhesive 81 is further enhanced by the second step, a sufficient fixing strength can be ensured even the magnet 5 is fixed on the inner peripheral face 301 of the circumferential wall part 30 with an adhesive.

The first adhesive 81 and the second adhesive 82 may be thermally cured at the same time in the second step.

Figure 5:
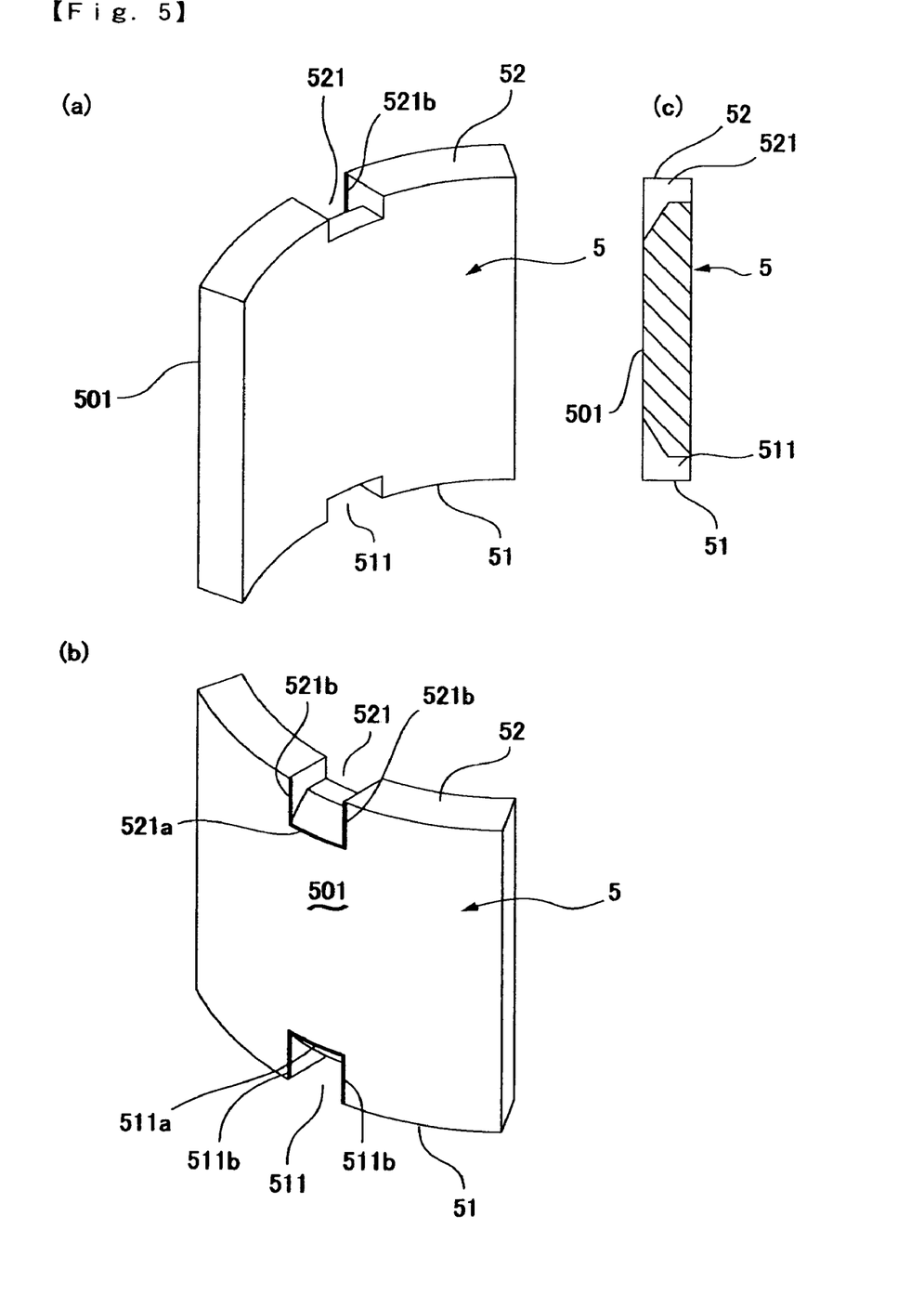
FIG. 5(a) is a perspective view showing a magnet which is viewed from its inner peripheral side in accordance with a first modified embodiment of the present invention.
FIG. 5(b) is a perspective view which is viewed from its outer peripheral side.
FIG. 5(c) is its longitudinal cross-sectional view.
Figure 6:
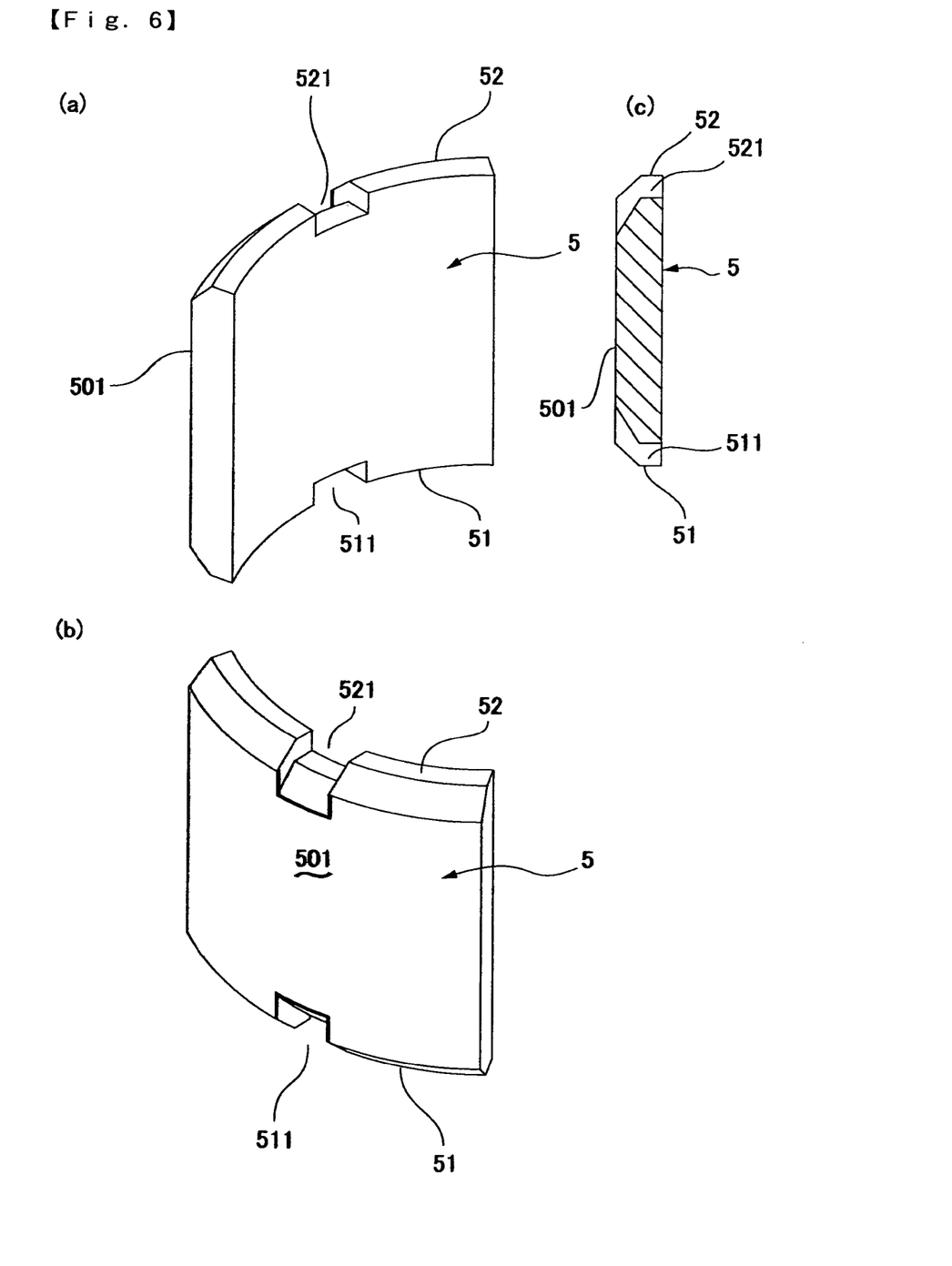
FIG. 6(a) is a perspective view showing a magnet which is viewed from its inner peripheral side in accordance with a second modified embodiment.
FIG. 6(b) is a perspective view which is viewed from its outer peripheral side.
FIG. 6(c) is its longitudinal cross-sectional view.
Figure 7:
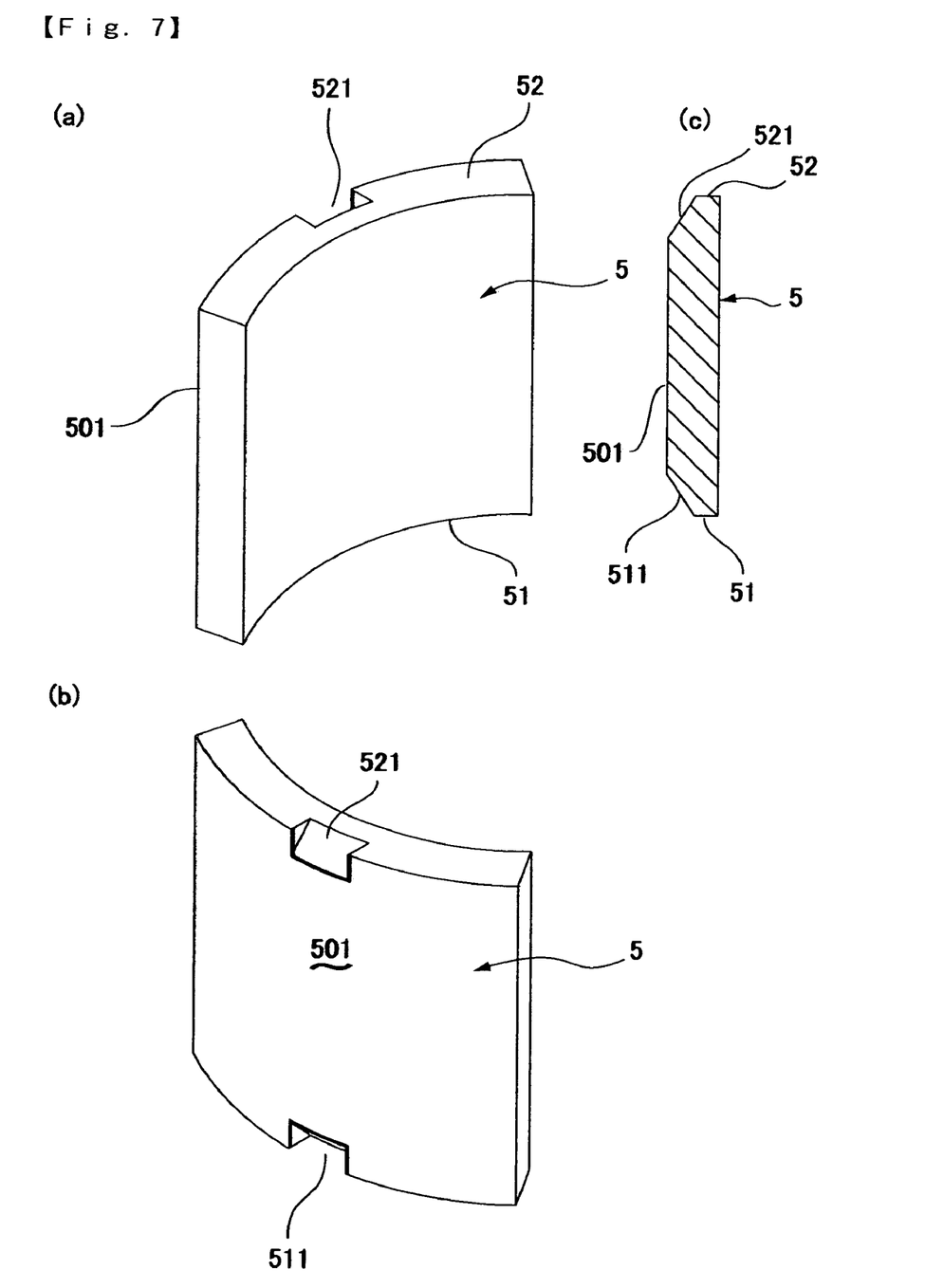
FIG. 7(a) is a perspective view showing a magnet which is viewed from its inner peripheral side in accordance with a third modified embodiment.
FIG. 7(b) is a perspective view which is viewed from its outer peripheral side.
FIG. 7(c) is its longitudinal cross-sectional view.
Figure 8:
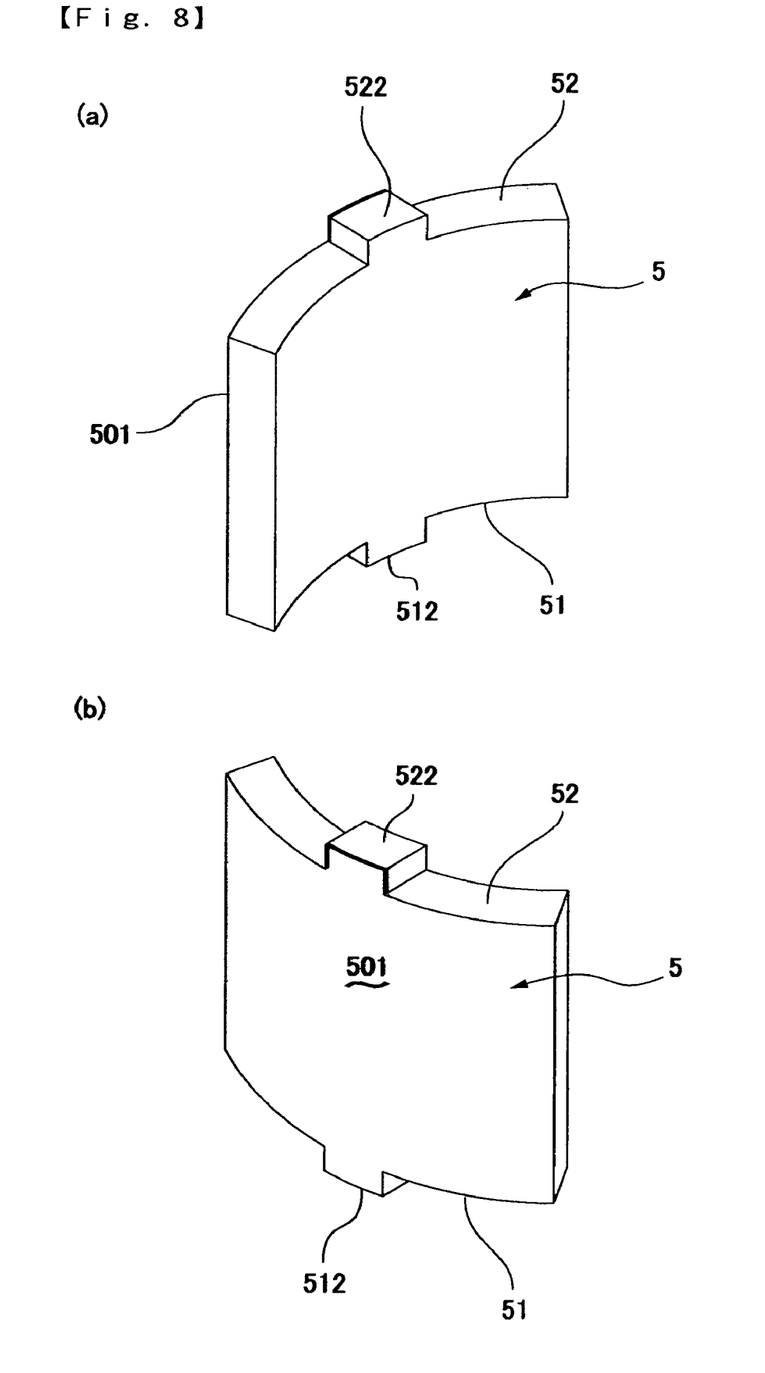
FIG. 8(a) is a perspective view showing a magnet which is viewed from its inner peripheral side in accordance with a fourth modified embodiment.
FIG. 8(b) is a perspective view which is viewed from its outer peripheral side.

FIG. 5(a) is a perspective view showing a magnet which is viewed from its inner peripheral side in accordance with a first modified embodiment of the present invention, FIG. 5(b) is a perspective view which is viewed from its outer peripheral side, and FIG. 5(c) is its longitudinal cross-sectional view. FIG. 6(a) is a perspective view showing a magnet which is viewed from its inner peripheral side in accordance with a second modified embodiment, FIG. 6(b) is a perspective view which is viewed from its outer peripheral side, and FIG. 6(c) is its longitudinal cross-sectional view. FIG. 7(a) is a perspective view showing a magnet which is viewed from its inner peripheral side in accordance with a third modified embodiment, FIG. 7(b) is a perspective view which is viewed from its outer peripheral side, and FIG. 7(c) is its longitudinal cross-sectional view. FIG. 8(a) is a perspective view showing a magnet which is viewed from its inner peripheral side in accordance with a fourth modified embodiment, and FIG. 8(b) is a perspective view which is viewed from its outer peripheral side.

In the embodiment described above, the first recessed part 511 and the second recessed part 521 are respectively formed in a shape where the entire in the thickness direction of the magnet 5 is removed. However, as shown in FIGS. 5(a), 5(b) and 5(c), the first recessed part 511 and the second recessed part 521 may be formed such that bottom parts 511a, 521a perpendicular to the axial direction are formed in a tapered face from a midway position in the thickness direction which is obliquely chamfered toward the outer peripheral side. According to the construction described above, the contact area between the magnet 5 and the first adhesive 81, the second adhesive 82 can be increased. Further, a gap space for accommodating surplus adhesive is formed between the inner peripheral face 301 of the circumferential wall part 30 of the case 3 and the tapered face and thus extrusion of the adhesive can be prevented.

Further, the first recessed part 511 and the second recessed part 521 may be formed such that side face parts 511b, 521b extended in the axial direction are formed in a tapered face from a midway position in the thickness direction which is obliquely chamfered toward the outer peripheral side. Alternatively, the first recessed part 511 and the second recessed part 521 may be formed such that both the side face parts 511b, 521b and the bottom parts 511a, 521a are formed in a tapered face from a midway position in the thickness direction which is obliquely chamfered toward the outer peripheral side.

Further, as shown in FIGS. 6(a), 6(b) and 6(c), the entire outer peripheral edge parts of the first end face 51 and the second end face 52 of the magnet 5 may be formed in a tapered face from a midway position in the thickness direction which is obliquely chamfered toward the outer peripheral side.

The first recessed part 511 and the second recessed part 521 may be only required to be dented in the axial direction at least on its outer peripheral side (side of the circumferential wall part 30 of the case 3). Therefore, as shown in FIGS. 7(a), 7(b) and 7(c), the first recessed part 511 and the second recessed part 521 may be formed such that parts of the outer peripheral edge parts of the first end face 51 and the second end face 52 are obliquely chamfered from a midway position of the magnet 5 in the thickness direction toward the outer peripheral side.

When the first recessed part 511 and the second recessed part 521 are formed in the magnet 5, a long contacting distance with the adhesive can be secured without extending the dimension in the axial direction. Therefore, judging from a viewpoint to secure a long contacting distance with an adhesive, in accordance with an embodiment, as shown in FIGS. 8(a) and 8(b), the first protruded part 512 and the second protruded part 522 that are protruded in the axial direction may be formed in the first end face 51 and the second end face 52 of the magnet 5.

The present invention is suitable to fix the magnet 5 on the inner peripheral face 301 of the circumferential wall part 30 of a member which is provided with the aperture part 36 on one side in the axial direction. Therefore, in the embodiment described above, the magnet 5 is fixed on the inner peripheral face 301 of the circumferential wall part 30 of the case 3. However, for example, in an outer rotor type of motor, the present invention may be applied to a rotor case on which a rotor magnet is fixed on the inner peripheral face of the circumferential wall part of the rotor case. Further, the present invention may be applied to a motor which is provided with one magnet or more than three magnets. In addition, a plurality of recessed parts or protruded parts may be formed in the magnet.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a circumferential wall part of a case which is provided with an opening part on one end side in an axial direction;
   a magnet which is fixed to an inner peripheral face of the circumferential wall part;
   a first adhesive for fixing at least a part of an outer peripheral face of the magnet to the inner peripheral face of the circumferential wall part; and
   a second adhesive for fixing an outer peripheral edge part of a first end face of the magnet being located on a side of the opening part to the inner peripheral face of the circumferential wall part,
   wherein at least one of one or more first recessed part, which is formed to be dented in the axial direction, and one or more first protruded part, which is protruded in the axial direction, which is formed at least on the outer peripheral face in the first end face of the magnet, wherein an outer peripheral edge part of the first recessed part or an outer peripheral edge part of the first protruded part is fixed on the inner peripheral face of the circumferential wall part with the second adhsive existing along the outer peripheral edge part of the first protruded part.

2. The motor according to claim 1, wherein the first recessed part is formed in a shape where an entire portion in a thickness direction of the magnet is removed, or in a shape which is obliquely chamfered from a midway position of the magnet in the thickness direction toward the outer peripheral side.

3. The motor according to claim 2, wherein an outer peripheral edge part of a second recessed part or an outer peripheral edge part of a second protruded part is fixed on the inner peripheral face of the circumferential wall part with the first adhesive existing along the outer peripheral edge part of the second recessed part or existing along the outer peripheral edge part of the second protruded part.

4. The motor according to claim 1, wherein an entire outer peripheral edge part of the end face of the magnet is obliquely chamfered from a midway position of the magnet in the thickness direction toward the outer peripheral side.

5. The motor according to claim 1, wherein the first adhesive and the second adhesive is the same adhesive material.

6. A motor comprising:
   a circumferential wall part of a case which is provided with an opening part on one end side in an axial direction;
   a magnet which is fixed to an inner peripheral face of the circumferential wall part;
   a first adhesive for fixing at least a part of an outer peripheral face of the magnet to the inner peripheral face of the circumferential wall part; and
   a second adhesive for fixing an outer peripheral edge part of a first end face of the magnet being located on the side of the opening part to the inner peripheral face of the circumferential wall part,
   wherein an outer peripheral edge part of a second end face of the magnet which is located on a opposite side to the opening part is fixed to the inner peripheral face of the circumferential wall part with the first adhesive,
   wherein at least one of one or more second recessed part, which is formed to be dented in the axial direction, and one or more second protruded part, which is protruded in the axial direction, which is formed at least on the outer peripheral side in the second end face of the magnet,
   wherein an outer peripheral edge part of the second recessed part or an outer peripheral
   edge part of the second protruded part is fixed on the inner peripheral face of the circumferential wall part with the first adhesive.

7. The motor according to claim 6, wherein the second recessed part is formed in a shape where an entire in a thickness direction of the magnet is removed, or in a shape which is obliquely chamfered from a midway position of the magnet in the thickness direction toward the outer peripheral side.

8. The motor according to claim 6, wherein the second recessed part is formed such that at least one of a side face part extending in the axial direction and a bottom part perpendicular to the axial direction is formed in a shape which is obliquely chamfered from a midway position of the magnet in the thickness direction toward the outer peripheral side.

9. A motor comprising:
   a circumferential wall part of a case which is provided with an opening part on one end side in an axial direction;
   a magnet which is fixed to an inner peripheral face of the circumferential wall part;
   a first adhesive for fixing at least a part of an outer peripheral face of the magnet to the inner peripheral face of the circumferential wall part; and
   a second adhesive for fixing an outer peripheral edge part of a first end face of the magnet being located on the side of the opening part to the inner peripheral face of the circumferential wall part
   wherein at least one of one or more first recessed part, which is formed to be dented in the axial direction, and one or more first protruded part, which is protruded in the axial direction, which is formed at least on the outer peripheral face in the first end face of the magnet, wherein an outer peripheral edge part of the first recessed part or an outer peripheral edge part of the first protruded part is fixed on the inner peripheral face of the circumferential wall part with the second adhesive existing along the outer peripheral edge part of the first protruded part,
   wherein the first recessed part is formed such that at least one of a side face part extending in the axial direction and a bottom part perpendicular to the axial direction is formed in a shape which is obliquely chamfered from a midway position of the magnet in the thickness direction toward the outer peripheral side.

* * * * *